(No Model.)
H. LIND.
BICYCLE.
No. 502,232.      Patented July 25, 1893.
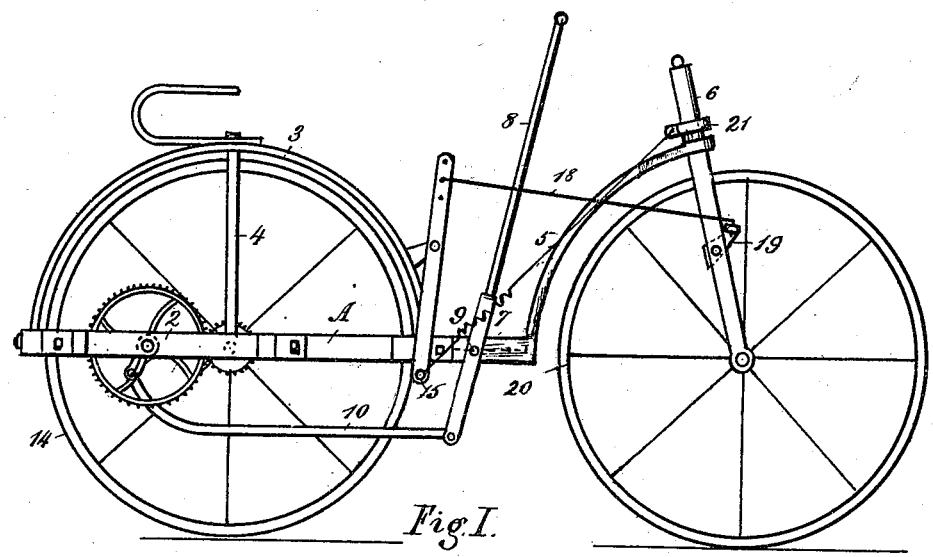
Fig. I.
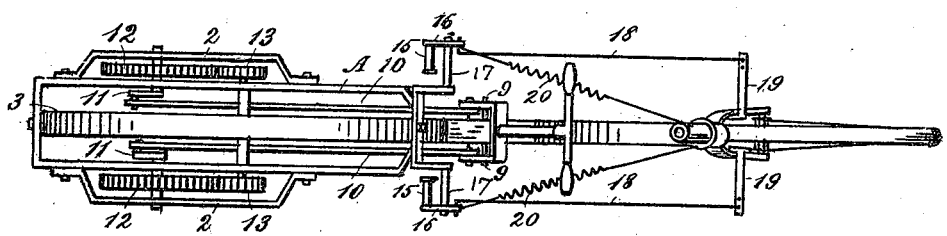
Fig. II.
Witnesses
R. S. Millar
L. M. Adams
Inventor
Hugh Lind
By J. E. Bailey Atty

UNITED STATES PATENT OFFICE.

HUGH LIND, OF WHITEWATER, COLORADO, ASSIGNOR OF ONE-HALF TO J. R. SNYDER, OF SAME PLACE.

BICYCLE.

SPECIFICATION forming part of Letters Patent No. 502,232, dated July 25, 1893.

Application filed February 4, 1893. Serial No. 461,050. (No model.)

*To all whom it may concern:*

Be it known that I, HUGH LIND, a citizen of the United States, residing at Whitewater, in the county of Mesa and State of Colorado, have invented a new and useful Improvement in Bicycles, which improvement is fully set forth in the following specification and accompanying drawings, in which—

Figure 1 is a side elevation of my improved bicycle, and Fig. 2, a plan view of the same.

My invention relates to certain improvements in the form and construction of bicycles, and its object is to provide novel, practical and efficient means whereby the vehicle may be advantageously propelled by hand and at the same time made capable of accelerating the speed without increasing the power to the extent required in bicycles as hitherto constructed. The prevailing argument in favor of the bicycle is based on its capacity to afford healthy exercise as well as recreation. Admitting all that can be justly claimed in that behalf, it has been abundantly demonstrated that no physical exercise is so desirable and beneficial as that which calls into action and develops the muscles of the arms and the chest.

The peculiar features of my invention will be understood by reference to the accompanying drawings in which—

A indicates the main frame provided with supplemental side bars 2 which form guards and journal bearings for the gear wheels. The arch or back-bone 3 is centrally supported by a standard 4 and has an integral forward extension 5, the extremity of which forms a journal for the head of the steering bar 6. The horizontal portion of the back-bone, extending forwardly from the arch is reinforced by a bar 7 which is secured by suitable bolts. It will be observed that the frame and back-bone being thus constructed and combined are exceptionally strong and durable without having any surplus material which will unnecessarily increase the weight of the machine.

The motive power consists of a hand-lever 8 which swings on a pivot or fulcrum 9. The bifurcated lower ends of the lever are pivotally attached to pitman bars 10 which engage cranks 11 and transmit motion to the gear wheels 12 and thence by pinions 13 to the driving wheel 14.

The machine is guided by means of pedals 15 provided with levers 16 which swing on a cross bar 17 attached to the front portion of the arch of the back-bone. The upper extremities of the pedal are provided with connecting rods 18 the forward ends of which are pivotally attached to arms 19 which are bolted to the forked extensions of the steering head. When traveling over straight and unobstructed roadways, the machine is automatically guided by equalizing springs 20 which extend from the lower ends of the pedal levers to a collar 21 attached to the steering head. The front and rear wheels are thus kept in alignment without any action on the part of the rider. If preferred, the springs may extend rearwardly from the pedal levers to a convenient point of attachment on the sides of the main frame A. The position of the rider is so arranged in relation to the hand lever that his feet need not be braced upon the pedals but may rest easily thereon. If more than ordinary speed be required, the feet may be braced against the cross-bar 19.

In view of the greatly increased leverage provided by my arrangement of the hand lever, it is obvious that it is impracticable to construct a pedal motor capable of commanding an equal amount of motive power.

It is understood that, if preferred, sprocket wheels and chains may be substituted for the gear wheels and pinions.

What I claim as new is—

In a bicycle, the combination of the herein described frame and adjuncts, of a hand lever having a bifurcated lower end; the pitman bars pivotally attached thereto and adapted to transmit motion, through the intervening gear wheels and pinions, to the driving wheel; the steering pedals pivoted to a cross bar attached to the front of the arch of the back bone and provided with connections having bearings upon the sides of the steering head, and the equalizing springs extending from the lower ends of the pedal to the steering head and adapted to hold the front and rear wheels automatically in alignment; all arranged substantially as and for the purposes herein set forth.

In testimony that I claim the foregoing I have hereunto set my hand, this 23d day of January, 1893, in the presence of witnesses.

HUGH LIND.

Witnesses:
JAMES PAGE,
MICHEAL BOWARETH.